Figure 1:
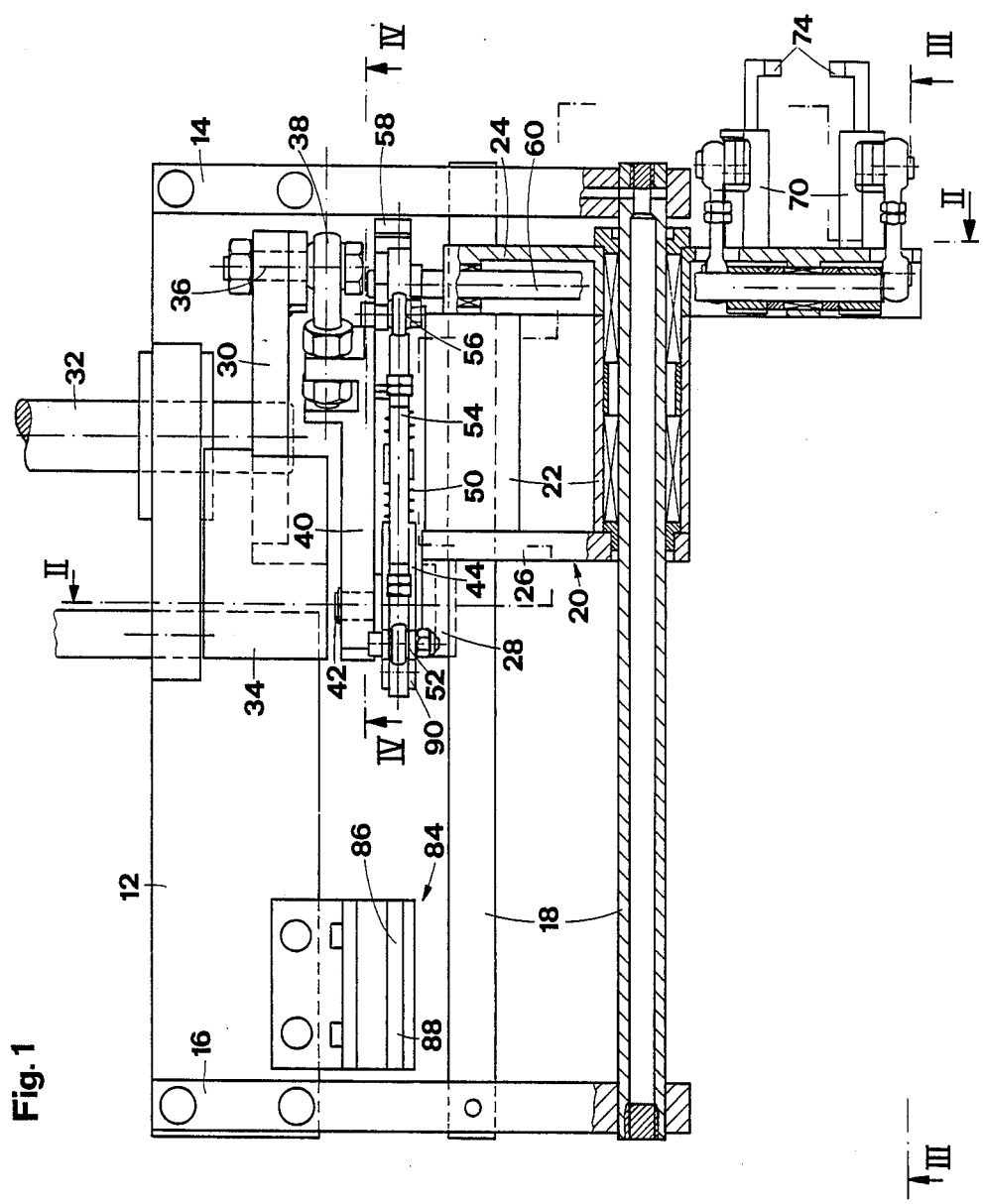

United States Patent [19]
Wittwer

[11] Patent Number: 4,834,233
[45] Date of Patent: May 30, 1989

[54] FEED DEVICE, PARTICULARLY FOR CAN BODIES
[75] Inventor: Rudolf Wittwer, Lengnau, Switzerland
[73] Assignee: Elpatronic AG, Zug, Switzerland
[21] Appl. No.: 182,793
[22] Filed: Apr. 18, 1988
[30] Foreign Application Priority Data
May 13, 1988 [CH] Switzerland .................. 01842/87
[51] Int. Cl.$^4$ ............................................. B65G 25/10
[52] U.S. Cl. ...................................... 198/746; 228/43
[58] Field of Search ............... 198/746, 736, 738, 747, 198/749, 743, 468, 1; 228/43; 413/70; 219/64, 79

[56] References Cited
U.S. PATENT DOCUMENTS

| 704,540 | 7/1902 | Hill | 198/743 |
|---|---|---|---|
| 1,862,386 | 6/1932 | Neff | 198/746 X |
| 3,001,637 | 9/1961 | Socke | 413/70 X |
| 3,431,768 | 3/1969 | Kull et al. | 198/736 X |

FOREIGN PATENT DOCUMENTS
3534209 6/1987 Fed. Rep. of Germany .

Primary Examiner—Robert J. Spar
Assistant Examiner—Cheryl L. Gastineau

[57] ABSTRACT

A pair of catches (74) is mounted on a sliding carriage (20) which is movable forwards and back along a guide (18) between a rear and a front dead centre (C,F), the catches being pivotable backwards and forwards between a working position and a position of rest. In order to move the sliding carriage (20) along the guide (18), a crank drive is provided. This has a crank (30), which can be driven in rotation, and a connecting rod (40), which is connected by a crank pivot joint (36) to the crank (30) and by a connecting-rod pivot point (42) to the sliding carriage (20). A control mechanism allows the catches (74) to assume their working position near the rear dead centre (C) of the sliding carriage (20) for its forward movement and to assume their position of rest near the front dead centre (F) of the sliding carriage (20) for its backward movement. The control mechanism comprises a bistable spring arrangement (44,50) which is disposed between the connecting rod (40) and the catches (74) and assumes each of two stable end positions once during each complete revolution of the crank (30).

8 Claims, 5 Drawing Sheets

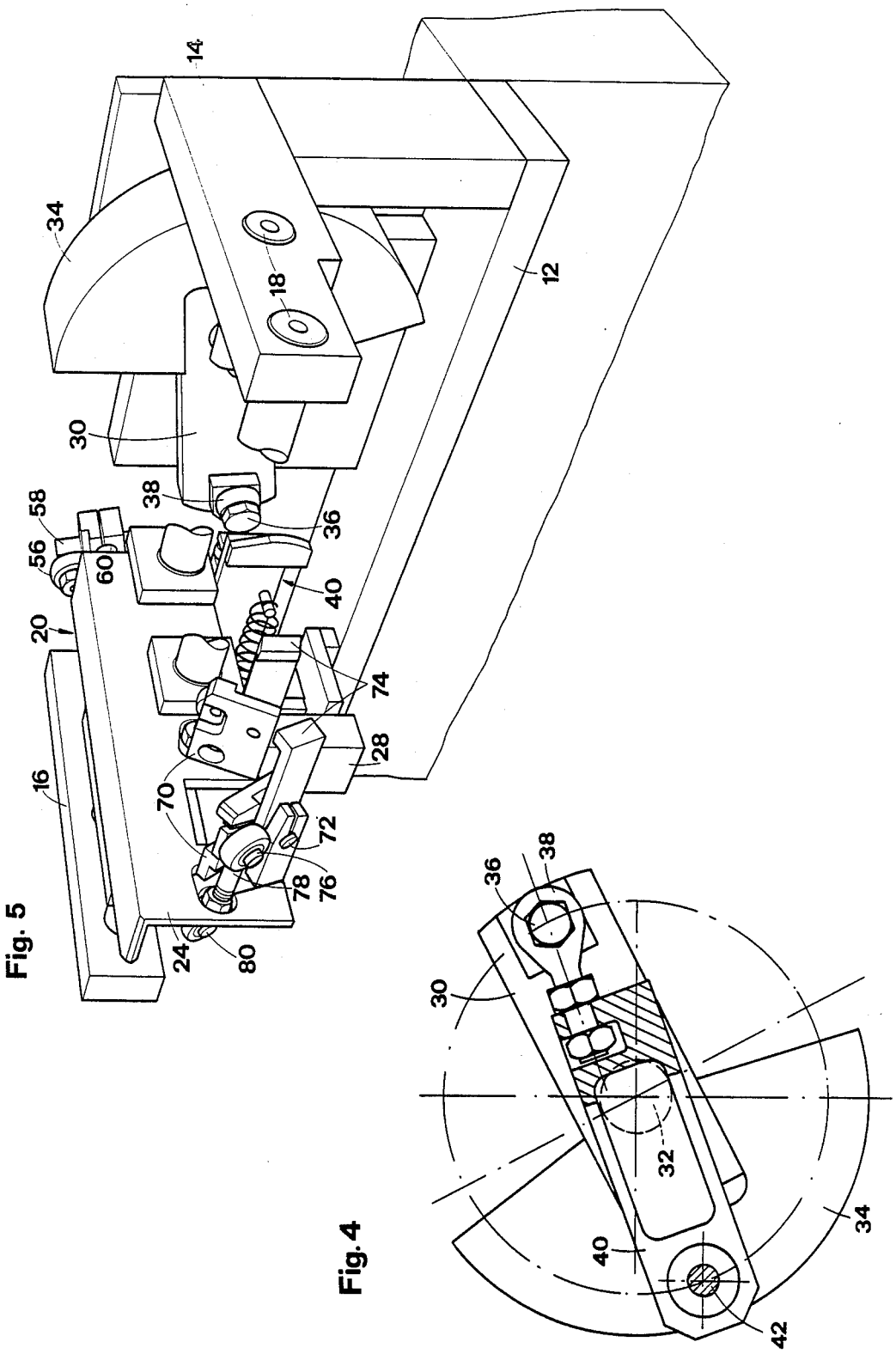

FEED DEVICE, PARTICULARLY FOR CAN BODIES

The invention relates to a feed device, particularly for can bodies, having a sliding carriage which is movable forwards and back along a guide between a rear and a front dead centre, at least one catch which is mounted on the sliding carriage and can be swung backwards and forwards between a working position and a position of rest, a crank drive with a crank which can be driven in rotation and a connecting rod which is connected by a crank pivot joint to the crank and by a connecting-rod pivot joint to the sliding carriage in order to move this along the guide, and a control mechanism which allows the catch to assume its working position near the read dead centre of the sliding carriage for its forward movement and its position of rest near the front dead centre of the sliding carriage for its backward movement.

A known feed device of this type (DE-A No. 3 534 209) comprises two sliding carriages which can be moved forwards and back simultaneously and through equal distances along parallel guides. A plurality of catches are disposed with spacing one behind the other on each of the two sliding carriages so that one catch of the one sliding carriage and one catch of the other sliding carriage can act in pairs on the rear edge of a can body in order to push this forwards. Associated with each of the two sliding carriages is a control slide which is displaceable parallel thereto and which is articulately connected to all the catches of the sliding carriage in question and forms a component of a control mechanism for swinging the catches.

The two control slides are always braked in such a manner that on each forward movement and each backward movement they lag behind the associated sliding carriage by a distance sufficient for the swinging of the catches. For this purpose, an endless, flexible tension member is secured to each control slide and is guided over a plurality of guide rollers, one of which is connected to a shaft brake. The two shaft brakes, which are thus components of the control mechanism for swinging the catches, consume some of the energy used for the movement of the sliding carriage. It is true that this portion of energy is relatively small but it can nevertheless make expensive cooling means necessary if the sliding carriages and hence also the control slides have to be moved forwards and back very quickly as is necessary for example if the longitudinal edges of five hundred and more can bodies per minute have to be welded together on modern can welding machines.

It is therefore the object of the invention to develop further a feed device of the type described at the beginning in such a manner that the proportional expenditure of energy necessary for controlling the catch or catches is further reduced.

According to the invention, the problem is solved in that the control mechanism comprises a bistable spring arrangement which is disposed between the connecting rod and the catch and assumes each of two stable end positions once during each complete rotation of the crank.

The energy consumption of the bistable spring arrangement is negligibly little since it results essentially only from internal friction losses which are associated with the constantly repeated storage and release of spring energy. To this must be added, at most, some energy losses through bearing friction but these can likewise be kept very low and in any case also occur in all known feed devices.

The bistable spring arrangement preferably comprises a rocker which is pivotable about the connecting-rod joint and is connected to the connecting-rod by a spring.

The spring may be a tension spring which is suspended eccentrically on the rocker. A bistable spring arrangement can, however, also be produced with springs of a different kind, for example with a compression spring or leaf spring in the manner known in electric snap switches. In any case, such bistable spring arrangements can be so formed or adjusted that they have a precisely reproducible snap-over behaviour.

According to a further development of the invention, a particularly appropriate means of reliably eliminating accidental influences on the snap-over behaviour lies in that the rocker carries a cam follower member which, in the region of the rear end centre of the sliding carriage, runs onto a blocking cam which prevents a premature snapping over of the bistable spring arrangement into its position corresponding to the working position of the catch.

A cam which acted directly on an associated catch or catch arrangement could be formed on the rocker. In an appropriate development of the invention, however, the rocker is connected by a quadrilateral linkage to a catch control shaft mounted on the sliding carriage. In this case, it is an advantage if the quadrilateral linkage comprises a coupling bar of adjustable length.

As a further safety measure, the connecting rod may carry a cam which urges the catch or catches into their working position near the rear dead centre of the sliding carriage and then prevents them from rebounding.

Finally, it is an advantage in this case if the quadrilateral linkage comprises a rocking lever which carries a cam follower member cooperating with the cam.

One example of embodiment of the invention is explained below, with further details, with reference to diagrammatic drawings.

Figure 2:
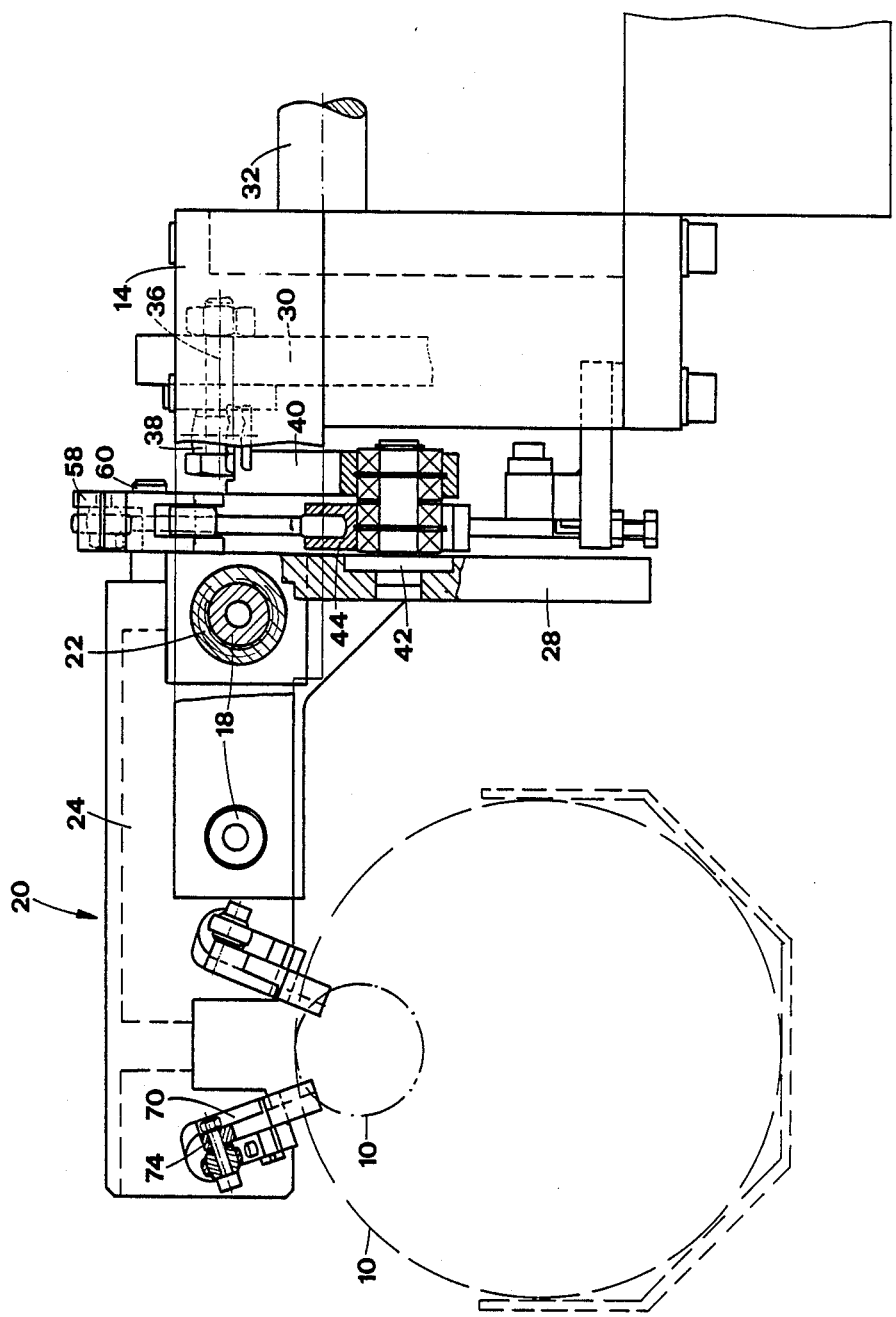
Figure 3:
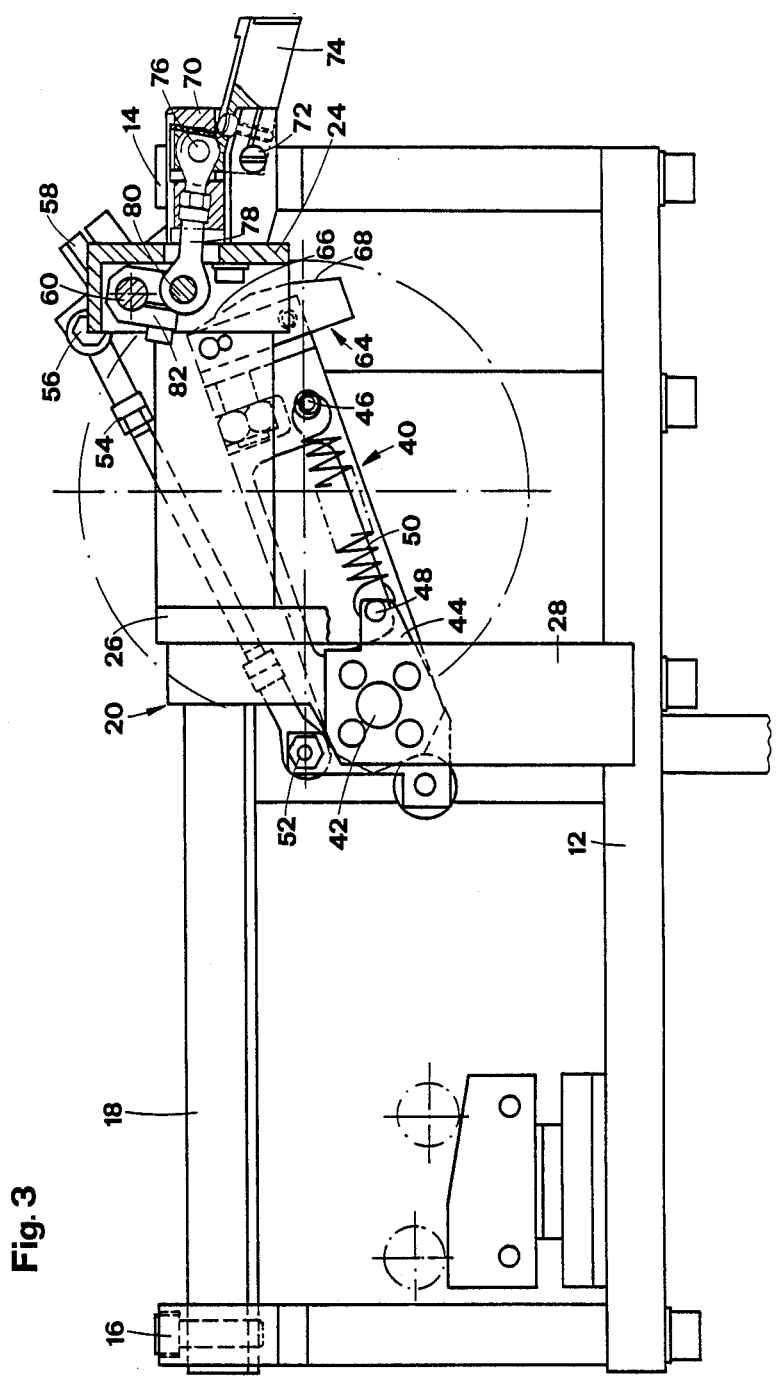
Figure 6:
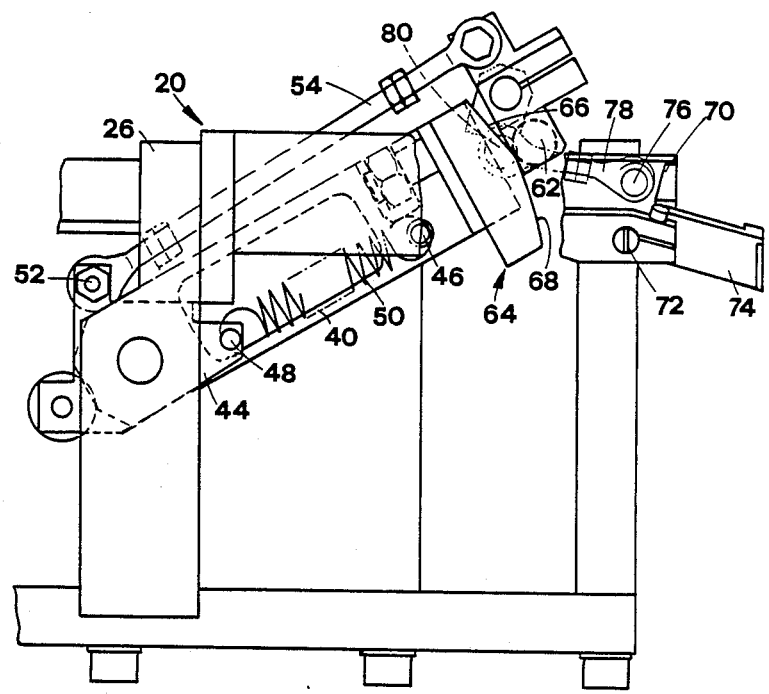
Figure 7:
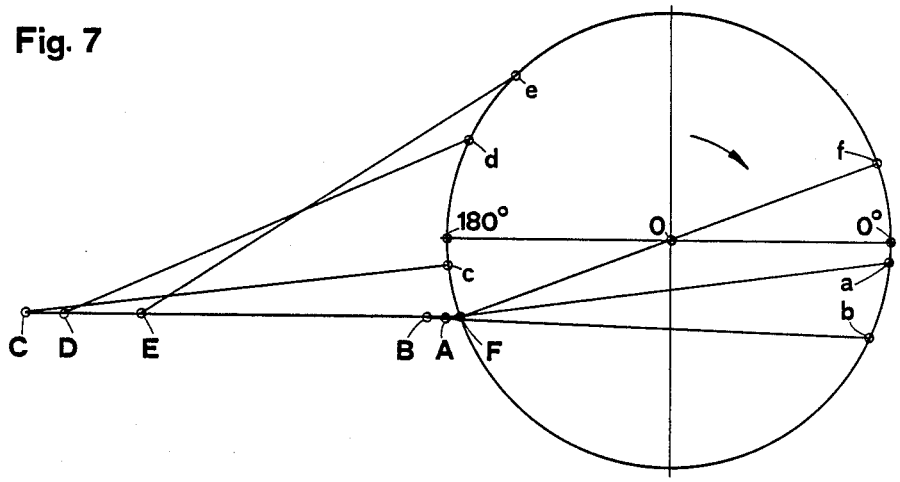

FIG. 1 shows the plan view of a feed device according to the invention in a front dead-centre position, shown partially as a section in the horizontal plane I—I in FIG. 2, FIG. 2 shows the front view of the feed device which is shown partially as a section in the vertical plane II—II in FIG. 1, FIG. 3 shows the associated side view which is shown partially as a section in the vertical plane III—III in FIG. 1, FIG. 4 shows the partial section in the vertical plane IV—IV in FIG. 1, FIG. 5 shows a view obliquely from the front of the device in its rear dead-centre position, FIG. 6 shows a view corresponding to FIG. 3 of the device on leaving its rear dead-centre position and FIG. 7 shows a motion diagram of the device.

The purpose of the feed device illustrated is to convey rounded can bodies 10 of sheet metal step-by-step into the welding region of a welding machine in which the longitudinal edges of the can bodies are welded together. The welding machine can be of known construction, for example it may be an electric resistance roller seam welding machine, and is therefore not illustrated.

The feed device has a machine frame 12 or is secured to one and comprises a front frame portion 14 and a rear frame portion 16 which extend parallel to one another and are connected to one another by a pair of parallel, horizontal bars which together form a guide 18. The bars of the guide 18 are made hollow and are connected to a cooling-water circuit so that they remain cool in operation and retain their accuracy of guidance.

A sliding carriage 20 is guided for movement forwards and back on the guide 18 by means of a pair of sleeves 22. The two sleeves 22 are connected to one another by a front cross arm 24 and a rear cross arm 26. Secured to the back of the rear cross arm 26 is a side wall 28 which extends downwards in a vertical plane parallel to the bars of the guide 18.

In all the Figures, a movement of the sliding carriage 20 towards the right is a forward movement during which a can body 10 is to be pushed forward. A movement towards the left, on the other hand, is a backward movement which the sliding carriage 20 should execute without a can body. A crank 30, which is secured to a driving shaft 32 which can be driven continuously in rotation, serves to drive the sliding carriage 20. The driving shaft 32 is mounted in the machine frame 12, extends horizontally transversely to the guide 18 and carries a counterweight 34 which counterbalances the inertial mass of the crank 30 and of the components connected thereto.

The crank 30 is connected, by a crank pivot joint 36 parallel to the driving shaft 32, to a bearing member 38 of a connecting rod 40. The connecting rod 40 is in turn connected, by a connecting-rod pivot joint 42 likewise parallel to the driving shaft 32, to the side wall 28, that is to say to the sliding carriage 20. The effective length of the connecting rod 40 between the crank joint 36 and the connecting-rod joint 42 is adjustable by means of the bearing member 38.

Further mounted on the sliding carriage 20 by means of the connecting-rod pivot joint 42 is a rocker 44. Secured to the connecting rod 40 and spaced from the rocker 44 is a pin 46 which is connected, by a spring 50, to a pin 48 secured to the rocker 44 and spaced from the connecting-rod joint 42. In the example illustrated, the spring 50 is a helical tension spring; together with the rocker 44, it forms a bistable spring arrangement. This means that the line of action of the spring 50 can extend with a spacing below or with a spacing above the geometrical axis of the connecting-rod joint 42, according to the position of the connecting rod 50, and the tensile force of the spring 50 accordingly exerts a tongue on the rocker 44 in counter-clockwise direction or in clockwise direction.

Formed on the rocker 44 with a spacing from the axis of the connecting-rod joint 42 and offset in relation to this by somewhat more than 90° towards the pin 48, is a joint 52 which connects the rocker 44 to a coupling bar 54. The coupling bar 54 has an adjustable length and is connected, by a joint 56 at its end remote from the joint 52, to an arm of the rocking lever 58. The rocking lever 58 is clamped, in a manner transmitting torque, to a control shaft 60 which extends parallel to the driving shaft 32 and hence likewise transversely to the guide 18, and is mounted for rotation in the front cross arm 24 of the sliding carriage 20.

Mounted on the end of the rocking lever 58 remote from the joint 56 is a cam follower member 62 in the form of a roller which can cooperate with a cam 64 adjustably secured to the connecting rod 40. The cam 64 has a wedge-shaped portion 66 and an arcuate portion 68 following thereon, the centre of which lies on the geometrical axis of the connecting-rod joint 42.

Secured to the front of the front cross arm 24 are two bearing blocks 70 on each of which a catch 74 is pivotally mounted, each by means of a pin 72. The pins 72 extend substantially horizontally transversely to the guide 18 so that the catches 74 can be swung up and down between a lower end position, their working position, and an upper end position, their position of rest. For the pivoting, each of the two catches 74 is connected, by a pivot joint 76 disposed above its pin 72, to a bar 78 which has an adjustable length and is connected, by a pivot joint 80 disposed below the control shaft 60, to a lever 82 clamped to the control shaft 60.

In FIGS. 1 to 4, the catches 74 are illustrated in their working position in which they are held in that the spring 50, as shown in FIG. 3, exerts a torque in counterclockwise direction on the rocker 44 so that the coupling bar 54 exerts a torque, which is likewise in counterclockwise direction, on the control shaft 60. Consequently, each of the two bars 78 transmits a torque to the associated catch 74 in clockwise direction, that is to say in the sense of the catch swinging downwards. The working position of each of the two catches 74 is determined by the adjustable length of the associated bar 78.

In the region of the rear dead centre of the sliding carriage 20, a blocking cam 84 is adjustably secured to the machine frame 12. Formed on the top of the blocking cam 84, seen from the front towards the rear, is a portion 86 rising in a wedge-shape and a horizontal portion 88 following thereon and therefore parallel to the guida 18. Associated with the blocking cam 84 is a cam follower member 90 in the form of a roller mounted on the rocker 44.

The mode of operation of the feed device described is described below with reference to FIG. 7.

In FIG. 7, a circle is illustrated with the points a to f which correspond to the various positions of the crank articulation 36, more precisely of its geometrical axis, during a complete revolution of the crank 30. In addition, a straight line is illustrated with the points A to F which indicate which positions the connecting rod joint, or more precisely its geometrical axis, is in when the crank joint 36 is in the various positions a to f given. This straight line with the points A to F has, in correspondence with the construction according to FIGS. 1 to 6, a spacing from the centre of the circle with the points a to f which amounts to 26 mm for example if the length of the crank 30, that is to say the radius of the circle, has the value 75 mm and if the length of the connecting rod 40 between the geometrical axes of the crank joint 36 and the connecting-rod joint 42 has the value 150 mm.

If the crank 30 rotates in the direction of the arrow, starting from its position designated by 0° in which it is directed horizontally forwards, the crank joint 36 reaches (after 5° in the example illustrated) a position a, while the connecting-rod joint 42 assumes the position A. Thus the connecting rod 40 extends from a to A at the same time assumes a position in which the line of action of the spring 50 has moved very close to the geometrical axis of the connecting-rod joint 42.

On the further travel of the connecting-rod joint 36 to the point b (in the angular position 24° in the example) and of the connecting-rod joint 42 to the point B, the line of action of the spring 50 intersects the geometrical axis of the connecting-rod joint 42 so that the bistable spring arrangement consisting of the rocker 44 and the spring 50 moves through its dead centre and then snaps over. The tensile force of the spring 50, which hitherto exerted a torque in counterclockwise direction on the rocker 44, as illustrated in FIG. 3, now exerts a torque in clockwise direction so that the rocker 44 turns accordingly and, because of the coupling by the coupling bar 54, the control shaft 60 also turns in clockwise direction. Because of the arrangement of the joints 76 and 80, the consequence of this is that the two catches 74 are swung in counterclockwise direction in FIG. 3, that is to say upwards into their position of rest.

On continued rotation of the crank 30 in the direction of the arrow, the connecting rod 40 pushes the sliding carriage 20, at first with increasing speed and then with decreasing speed again, towards the rear. When the crank joint 36 passes through the point c (173.5°), the connecting-rod joint 42 is at the point C; the sliding carriage 20 has reached its rear dead centre. During the last portion of the travel towards the rear dead centre, the cam follower member 90 has rolled onto the blocking cam 84 as a result of which the rocker 44 is temporarily prevented from swinging back into its original position illustrated in FIG. 3. Thus the possibility of the bistable spring arrangement consisting of the rocker 44 and the spring 50 snapping back prematurely as a result of vibration coming from the outside or other unforseen influences, is ruled out.

When the crank joint 36 has reached the joint d (206°), however, and so the connecting-rod joint 42 has reached the point D, the cam follower member 90 has left the horizontal portion 88 of the repelling cam 84 again and begins to roll down its portion 86. As a result, the bistable spring arrangement 44, 50 is enabled to snap back and this occurs when the crank joint 36 is on the way from d to e (226°), while the connecting-rod joint 42 passes from D to E. The line of action of the spring 50 is now again lying below the geometrical axis of the connecting-rod joint 42 so that the tensile force of the spring 50, as seen in FIG. 3, again exerts a torque in counterclockwise direction on the rocker 44 and hence also on the control shaft 60. As a result, the bars 78 are pushed forwards and pivot the catches 74 downwards into their working position.

In order to ensure that the relatively small angular distance from d to e—20° in the example illustrated—is sure to be sufficient to allow the catches 74 to assume their working position even if they should be counteracted by increased frictional resistance, for example because of the presence of dirt, the cam 64 presses with its wedge-shaped portion 66 against the cam follower member 62 and as a result compels the pivoting of the rocking lever 58 and hence the rotation of the control shaft 60 in counterclockwise direction. When the crank joint 36 has passed over the point e, the arcuate portion 68 of the cam 64 acts on the cam follower member 62 and prevents the catches 74 from rebounding even if these should have been moved very abruptly into their working position by the bistable spring arrangement 44, 50. In this manner, assurance is provided that the catches 74 act in the prescribed manner on the rear edge of a can body 10 which is to be moved forwards.

The forward movement ends in the position f (340°) of the crank joint 36, which corresponds to the position F of the connecting-rod joint 42 which in turn represents the front dead centre of the carriage 20. Now, at the latest, the can body 10 pushed forwards is grasped, in the usual manner in electric resistance roller seam welding machines, by electrode rollers or by an electrode wire taken over electrode supporting rollers and is entrained further forwards. The sliding carriage 20, on the other hand, begins its backward stroke while the catches 74 continue to occupy their working position until the crank joint 36 has again reached the region between the points a and b in which the bistable spring arrangement 44, 50 snaps over in the manner described.

I claim:

1. A feed device, particularly for can bodies (10), having
   a sliding carriage (20) which is movable forwards and back along a guide (18) between a rear and a front dead centre (C,F),
   at least one catch (74) which is mounted on the sliding carriage (20) and can be swung forwards and backwards between a working position and a position of rest,
   a crank drive with a crank (30) which can be driven in rotation, and a connecting rod (40) which is connected by a crank pivot joint (36) to the crank (30) and by a connecting-rod pivot joint (42) to the sliding carriage (20) in order to move this along the guide (18), and
   a control mechanism which allows the catch (74) to assume its working position near the rear dead centre (C) of the sliding carriage (20) for its forward movement and to assume its position of rest near the front dead centre (F) of the sliding carriage (20) for its backward movement, characterized in that the control mechanism comprises a bistable spring arrangement (44, 50) which is disposed between the connecting rod (40) and the catch (74) and assumes each of two stable end positions once during each complete revolution of the crank (30).

2. A feed device according to claim 1, characterized in that the bistable spring arrangement (44, 50) comprises a rocker (44) which is pivotable about the connecting-rod joint (42) and is connected to the connecting rod (40) by a spring (50).

3. A feed device according to claim 2, characterized in that the spring (50) is a tension spring which is eccentrically suspended on the rocker (44).

4. A feed device according to claim 2, characterized in that the rocker (44) carries a cam follower member (90) which, in the region of the rear dead centre (C) of the sliding carriage (20), runs onto a blocking cam (84) which prevents the bistable spring arrangement (44, 50) from snapping over prematurely into its position corresponding to the working position of the catch (74).

5. A feed device according to claim 2, characterized in that the rocker (44) is connected by a quadrilateral linkage (52, 54, 56, 58) to a catch control shaft (60) mounted on the sliding carriage (20).

6. A feed device according to claim 5, characterized in that the quadrilateral linkage (52, 54, 56, 58) comprises a coupling bar (54) of adjustable length.

7. A feed device according to claim 1, characterized in that the connecting rod (40) carries a cam (64) which forces the catch or catches (74) into their working position near the rear dead centre (C) of the sliding carriage (20) and then prevents them from rebounding.

8. A feed device according to claim 5, characterized in that the quadrilateral linkage (52, 54, 56, 58) comprises a rocking lever (58) which carries a cam follower member (62) corresponding with the cam (64).

* * * * *

UNITED STATES PATENT AND TRADEMARK OFFICE
CERTIFICATE OF CORRECTION

PATENT NO. : 4,834,233

DATED : May 30, 1989

INVENTOR(S) : Rudolf Wittwer

It is certified that error appears in the above-identified patent and that said Letters Patent is hereby corrected as shown below:

Column 1, line 19 delete "read" and substitute --rear--.
Column 2, line 22 delete "end" and substitute --dead--.
Column 3, line 50, delete "tongue" and substitute --torque--.

Column 4, line 33, delete "guida" and substitute --guide--.
Column 5, line 29, delete second occurrence of "joint" and substitute --point--.
Column 6, line 67, delete "corresponding" and substitute --cooperating--.

Signed and Sealed this

Fourteenth Day of November, 1989

*Attest:*

JEFFREY M. SAMUELS

*Attesting Officer*     *Acting Commissioner of Patents and Trademarks*